United States Patent
Pei et al.

(10) Patent No.: US 12,544,900 B2
(45) Date of Patent: Feb. 10, 2026

(54) POWER TOOL

(71) Applicant: Nanjing Chervon Industry Co., Ltd., Nanjing (CN)

(72) Inventors: Qingqing Pei, Nanjing (CN); Shubin Tong, Nanjing (CN); Yonghui Cheng, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/968,632

(22) Filed: Dec. 4, 2024

(65) Prior Publication Data

US 2025/0091187 A1    Mar. 20, 2025

Related U.S. Application Data

(63) Continuation of application No. PCT/CN2023/102094, filed on Jun. 25, 2023.

(30) Foreign Application Priority Data

Jun. 29, 2022 (CN) .......................... 202210753497.9

(51) Int. Cl.
*B25F 5/00* (2006.01)
*B23B 45/02* (2006.01)

(52) U.S. Cl.
CPC ................ *B25F 5/00* (2013.01); *B23B 45/02* (2013.01)

(58) Field of Classification Search
CPC ....... B23B 45/02; B23B 45/008; B25B 21/00; B25F 1/00
See application file for complete search history.

(56) References Cited

U.S. PATENT DOCUMENTS

2006/0225906 A1* 10/2006 Chen ...................... B25F 5/006
173/210
2022/0281095 A1* 9/2022 Abbott .................... B23Q 5/043

FOREIGN PATENT DOCUMENTS

| CN | 1605439 A | 4/2005 |
| CN | 105215915 A | 1/2016 |
| CN | 106584370 A | 4/2017 |
| CN | 211661970 U | 10/2020 |
| CN | 112192518 A | 1/2021 |

(Continued)

OTHER PUBLICATIONS

ISA/CN, International Search Report issued on PCT application No. PCT/CN2023/102094, dated Sep. 28, 2023, 3 pages.

(Continued)

*Primary Examiner* — Daniel Jeremy Leeds
(74) *Attorney, Agent, or Firm* — Greenberg Traurig, LLP

(57) ABSTRACT

A power tool includes a locking mechanism for locking the output shaft when the output shaft transmits torque to the motor shaft. The locking mechanism includes a shaft lock bracket connected to the output shaft to drive the output shaft; and a damping assembly including a first mounting portion connected to the output shaft, a second mounting portion connected to the shaft lock bracket, and a buffer part. The buffer part connects the first mounting portion to the second mounting portion. When the output shaft and the shaft lock bracket move relative to each other, the buffer part undergoes the torsional deformation to provide a buffer force that delays the movement of the output shaft relative to the shaft lock bracket.

19 Claims, 9 Drawing Sheets

(56) References Cited

FOREIGN PATENT DOCUMENTS

CN         116619308 A     8/2023
DE    202016107390 U1    1/2017
TW          588680 U1 *  5/2004

OTHER PUBLICATIONS

ISA/CN, English translation of International Search Report issued on PCT application No. PCT/CN2023/102094, dated Sep. 28, 2023, 3 pages.
ISA/CN, Written Opinion issued on PCT application No. PCT/US2023/102094, dated Sep. 28, 2023, 4 pages.
ISA/CN, English translation of Written Opinion issued on PCT application No. PCT/US2023/102094, dated Sep. 28, 2023, 5 pages.

* cited by examiner

B-B

C-C

B-B

C-C

B-B

C-C

POWER TOOL

RELATED APPLICATION INFORMATION

This application is a continuation of International Application Number PCT/CN2023/102094, filed on Jun. 25, 2023, through which this application also claims the benefit under 35 U.S.C. § 119(a) of Chinese Patent Application No. 202210753497.9 filed Jun. 29, 2022, which applications are incorporated herein by reference in their entireties.

TECHNICAL FIELD

The present application relates to a power tool, for example, a power tool that outputs torque through rotation.

BACKGROUND

Power tools on the market, for example, torque output tools represented by electric drills, screwdrivers, and the like, are very commonly used power tools. Among this type of power tools that output torque through rotation, the torque outputted by the motor shaft is transmitted to the output mechanism through the transmission mechanism and finally acts on the operated object.

Among this type of power tools that output torque through rotation, the output shaft is driven by the electric motor to rotate for forward transmission. During shutdown or gear shifting, due to inertia or when the output shaft is actively rotated by the user, the torque applied to the output shaft is transmitted to the transmission mechanism and the motor shaft, which is the reverse transmission. Reverse transmission often causes damage to components in the transmission mechanism, such as gears, affecting the service life. In addition, when the chuck threadedly connected to the output shaft is twisted off, the output shaft is not expected to rotate. Therefore, a shaft lock is often provided in this type of power tools.

This part provides background information related to the present application, and the background information is not necessarily the existing art.

SUMMARY

An example provides a power tool. The power tool includes a housing; a motor accommodated in the housing and including a drive shaft rotating about a first axis; an output shaft used for outputting torque and rotating about a second axis; and a locking mechanism for locking the output shaft when the output shaft is subjected to a force and transmits torque to the drive shaft. The locking mechanism includes a shaft lock bracket connected to the output shaft to drive the output shaft; and a damping assembly including a first mounting portion connected to the output shaft, a second mounting portion connected to the shaft lock bracket, and a buffer part connecting the first mounting portion to the second mounting portion, where when the output shaft and the shaft lock bracket move relative to each other, the buffer part undergoes the torsional deformation to provide a buffer force that delays the movement of the output shaft relative to the shaft lock bracket.

In some examples, the output shaft has a first outer circumferential surface; and the shaft lock bracket includes a first inner surface circumferentially surrounding the first outer circumferential surface. Optionally, a first gap is provided between the first inner surface and the first outer circumferential surface. Optionally, the damping assembly is disposed outside the first gap.

In some examples, the buffer part at least partially extends along the direction of the second axis.

In some examples, the first mounting portion, the second mounting portion, and the buffer part are an integral component.

In some examples, the locking mechanism further includes a shaft lock ring disposed around the output shaft; and locking members disposed between the shaft lock ring and the output shaft, where the locking members have at least a locking position and an unlocking position relative to the shaft lock ring.

In some examples, the shaft lock ring is disposed in the housing, and the shaft lock ring and the housing are not rotatable relative to each other.

In some examples, when the output shaft transmits torque to the drive shaft, the locking members are located at the locking position, and the locking members lock the rotation of the output shaft relative to the housing. When the drive shaft transmits torque to the output shaft, the locking members are located at the unlocking position, and the locking members release the rotation of the output shaft relative to the housing.

In some examples, the shaft lock bracket is further connected to or formed with switching blocks inserted between the shaft lock ring and the locking members, and the switching blocks are used for switching the locking members between the locking position and the unlocking position.

In some examples, by providing the first gap, the shaft lock bracket rotates relative to the output shaft within a preset angle range.

In some examples, the first mounting portion rotates synchronously with the output shaft.

In some examples, the second mounting portion rotates synchronously with the shaft lock bracket.

In some examples, the buffer part includes a first buffer part extending along the second axis and connected to the first mounting portion and a second buffer part extending along a direction perpendicular to the second axis and connected to the second mounting portion.

In some examples, the first buffer part and the second buffer part are fixedly connected or integrally formed.

In some examples, the first mounting portion and the second mounting portion are arranged front and back along the direction of the second axis.

In some examples, a battery pack is further included, where the battery pack supplies power to the motor.

An example further provides a power tool. The power tool includes a housing; a motor accommodated in the housing and including a drive shaft rotating about a first axis; an output shaft used for outputting torque and rotating about a second axis, where the output shaft has a first outer circumferential surface; and a locking mechanism for locking the output shaft when the output shaft is subjected to a force and transmits torque to the drive shaft, where the locking mechanism connects the motor to the output shaft. The locking mechanism includes a shaft lock bracket including a first inner surface at least surrounding part of the first outer circumferential surface, where a first gap is provided between the first inner surface and the first outer circumferential surface; and a damping assembly disposed outside the first gap, where when the output shaft and the shaft lock bracket move relative to each other, the damping assembly provides a buffer force along the direction of rotation of the output shaft, where the buffer force delays the movement of the output shaft relative to the shaft lock bracket.

An example further provides a power tool. The power tool includes a housing; a motor accommodated in the housing and including a drive shaft rotating about a first axis; an output shaft used for outputting torque and rotating about a second axis, where the output shaft has a first outer circumferential surface; and a locking mechanism for locking the output shaft when the output shaft is subjected to a force and transmits torque to the drive shaft, where the locking mechanism connects the motor to the output shaft. The locking mechanism includes a shaft lock bracket including a first inner surface at least surrounding part of the first outer circumferential surface, where a first gap is provided between the first inner surface and the first outer circumferential surface; and a damping assembly disposed outside the first gap and including an elastic element, where when the output shaft and the shaft lock bracket move relative to each other, the elastic element undergoes the torsional deformation to provide a buffer force that delays the movement of the output shaft relative to the shaft lock bracket.

In some examples, the damping assembly includes a first mounting portion connected to the output shaft, a second mounting portion connected to the shaft lock bracket, and a buffer part connecting the first mounting portion to the second mounting portion. Optionally, the elastic element is disposed on the buffer part.

In some examples, the locking mechanism further includes a shaft lock ring disposed around the output shaft; and locking members disposed between the shaft lock ring and the output shaft, where the locking members have at least a locking position and an unlocking position relative to the shaft lock ring.

In some examples, by providing the first gap, the shaft lock bracket rotates relative to the output shaft within a preset angle range.

DETAILED DESCRIPTION

Figure 1:
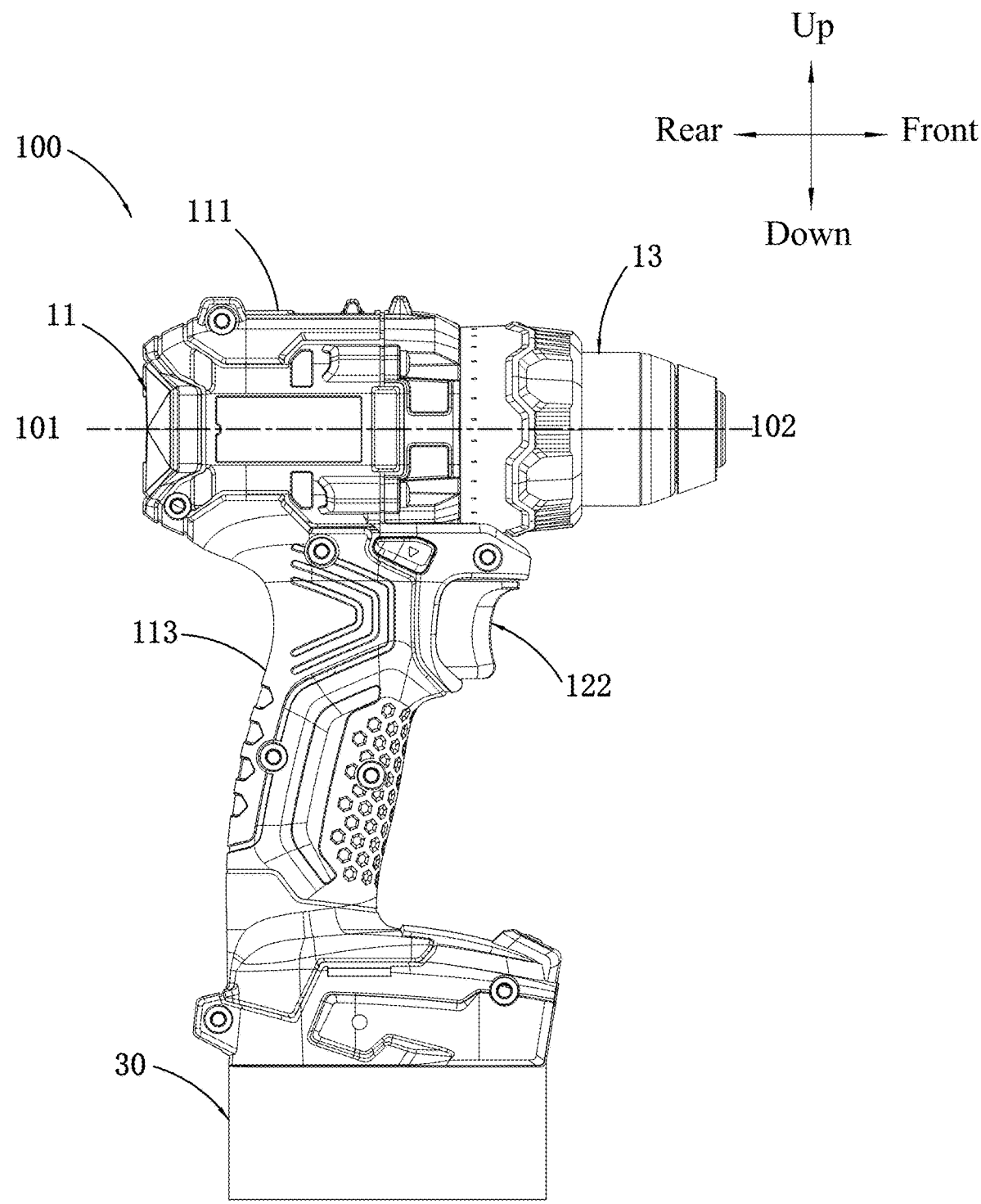
FIG. 1 is a structural view of a first example of the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

To clearly illustrate the technical solutions of the present application, an upper side, a lower side, a front side, and a rear side shown in FIG. 1 are further defined.

FIG. 1 shows a power tool in an example of the present application. The power tool is an electric drill 100. It is to be understood that in other alternative examples, the power tool may be another power tool that outputs torque through rotation, such as an electric screwdriver or a tool with both screwdriver and electric drill functions and may be another tool that converts rotational torque into other forms of motion, for example, a sanding tool, such as an angle grinder or a sander.

Figure 2:
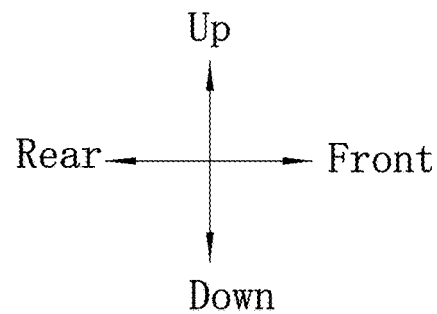
FIG. 2 is a partial view of the internal structural view and the half-sectional view of FIG. 1.
Figure 2:
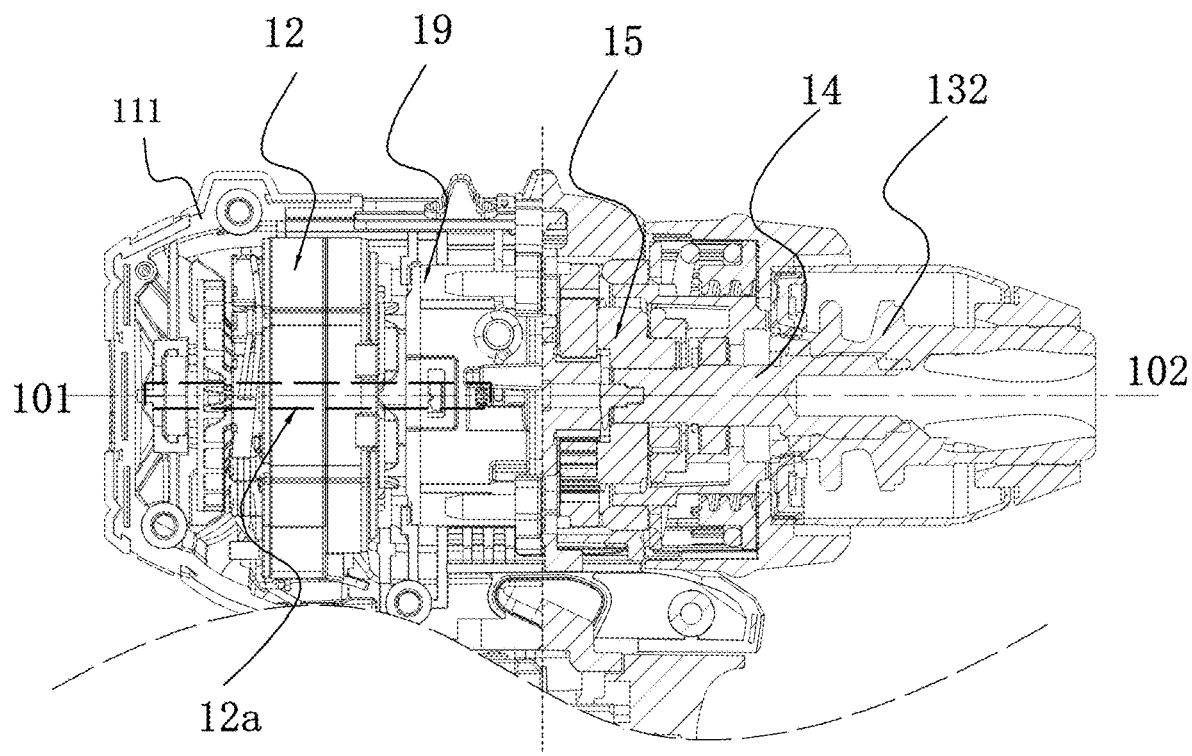
Figure 3:
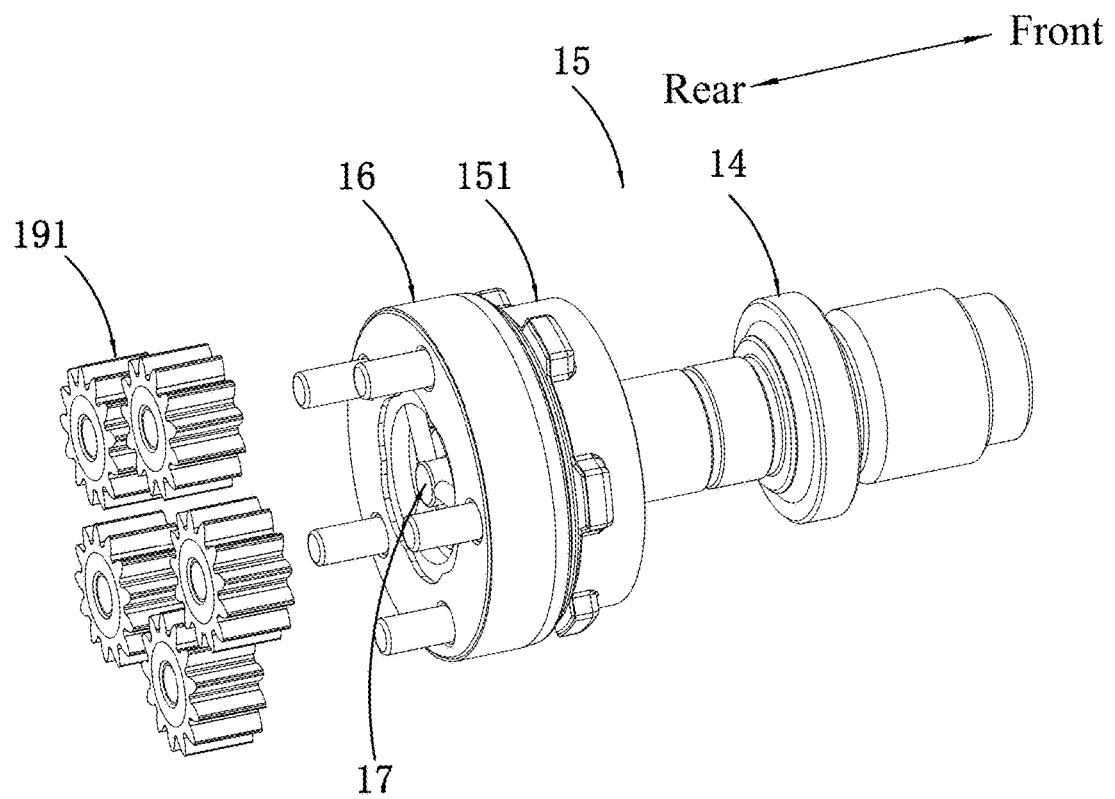
FIG. 3 is a structural view of a locking mechanism in FIG. 1.

FIGS. 1 to 3 show the electric drill 100 in an example of the present application, and the electric drill 100 includes a power device 30. The power device 30 is configured to supply electrical energy to the electric drill 100. In this example, the power device 30 is a battery pack, and the battery pack cooperates with a corresponding power circuit to power the electric drill 100. It is to be understood by those skilled in the art that the power device 30 is not limited to the scenario where the battery pack is used, and the corresponding components in the machine may be powered through mains power or an alternating current power supply in conjunction with corresponding rectifier, filter, and voltage regulator circuits.

The electric drill 100 includes a housing 11, a motor 12, a transmission mechanism 19, and an output mechanism 13. The housing 11 includes a motor housing 111 for accommodating an electric motor. The motor 12 includes a drive shaft 12a rotating about a first axis 101. In this example, the motor 12 is specifically configured to be an electric motor. An electric motor 12 is used below instead of the motor, and a motor shaft is used below instead of the drive shaft 12a, which is not intended to limit the present application.

The housing 11 is further formed with or connected to a grip 113 for a user to operate. The grip 113 and the motor housing 111 form a T-shaped or L-shaped structure, which is convenient for the user to hold and operate. The power device 30 is connected to an end of the grip 113. The power device 30 is detachably connected to the grip 113.

The electric drill 100 further includes a switch 122 mounted on the grip 113. When holding the grip 113, the user can trigger the switch 122 relatively conveniently. The switch 122 may be configured to be a main switch 122 for activating the electric drill 100.

The output mechanism 13 is used for receiving torque supplied by the electric motor 12 and outputting torque. The output mechanism 13 includes an output shaft 14 for connecting a work accessory and driving the work accessory to rotate. A clamping assembly 132 or a receiving portion is disposed at the front end of the output shaft 14 and may clamp corresponding working accessories, such as a screwdriver, a drill bit, and a sleeve, when different functions are implemented.

The output shaft 14 is used for outputting power, and the output shaft 14 rotates about an output axis. In this example, the output axis is a second axis 102. In this example, the first axis 101 coincides with the second axis 102. In other alternative examples, a certain included angle exists between the second axis 102 and the first axis 101. In other alternative examples, the first axis 101 and the second axis 102 are parallel to each other but do not coincide with each other.

The transmission mechanism 19 is disposed between the electric motor 12 and the output mechanism 13 and used for transmitting power between the electric motor 12 and the output mechanism 13.

The transmission assembly 19 includes a planetary gear train for deceleration. A one-stage or multi-stage planetary gear train may be provided. The planetary gear train converts the output rotational speed of the electric motor 12 according to a certain gear ratio to achieve appropriate torque. In addition, the transmission mechanism 19 further includes a gear shifter assembly to implement multi-gear output through multiple sets of gears with different gear ratios.

As shown in FIGS. 3 to 14, the electric drill 100 further includes a locking mechanism 15 to implement a shaft locking function for one-way transmission. The locking mechanism 15 is used for locking the rotation of the output shaft 14 when the output shaft 14 transmits torque to the motor shaft (not shown in the figure). The locking mechanism 15 connects the transmission mechanism 19 to the output mechanism 13.

In other alternative examples, the transmission mechanism 19 may not be provided. The motor shaft (not shown in the figure) directly drives the output mechanism 13. The locking mechanism 15 connects the electric motor 12 to the output mechanism 13.

In other alternative examples, it is to be understood that the power tool may be a rotary impact power tool, and in this case, an impact mechanism for providing an impact force is disposed between the transmission mechanism and the locking mechanism 15. The impact mechanism is used for applying an impact force to the output shaft.

In this example, the locking mechanism 15 includes a shaft lock bracket 16, a damping assembly 17, a shaft lock ring 151, and locking members 154. The shaft lock bracket 16 is used as a torque input assembly of the locking mechanism 15, and the shaft lock bracket 16 connects the transmission mechanism 19 to the output mechanism 13. The shaft lock bracket 16 connects a planetary gearset 191 closest to the output mechanism 13 to the output shaft 14. In this example, the output shaft 14 is rotatably connected to the shaft lock bracket 16. In other alternative examples, the output shaft 14 may be connected to other components to form an output portion and then connected to the shaft lock bracket 16. As long as the formed output portion and the output shaft 14 are rotatable synchronously, the formed output portion is connected to the shaft lock bracket 16, or the output shaft 14 is directly connected to the shaft lock bracket 16, which is not a limitation to the present application. Similarly, it is to be understood that the shaft lock bracket 16 may be connected to other components to form an input assembly as long as the formed input assembly and the shaft lock bracket 16 are rotatable synchronously, and it is not a limitation to the present application.

The output shaft 14 has a first outer circumferential surface 142. The shaft lock bracket 16 includes a first inner surface 1621 at least surrounding part of the first outer circumferential surface 142. A first gap 1622 is provided between the first inner surface 1621 and the first outer circumferential surface 142. The damping assembly 17 includes a first mounting portion 171, a second mounting portion 172, and a buffer part 173. The first mounting portion 171 is connected to the output shaft 14, the second mounting portion 172 is connected to the shaft lock bracket 16, and the buffer part 173 connects the first mounting portion 171 to the second mounting portion 172. The damping assembly 17 is disposed outside the first gap 1622, that is to say, the damping assembly 17 is not inserted or embedded into the first gap 1622. The buffer part 173 at least partially extends along the direction of the second axis 102. When the output shaft 14 and the shaft lock bracket 16 move relative to each other, the buffer part 173 undergoes the torsional deformation to provide a buffer force that delays the movement of the output shaft 14 relative to the shaft lock bracket 16.

In this example, the shaft lock ring 151 is disposed around the output shaft 14. The locking members 154 are disposed between the shaft lock ring 151 and the output shaft 14, and the locking members 154 have at least a locking position and an unlocking position relative to the shaft lock ring 151. When the output shaft 14 transmits torque to the motor shaft (not shown in the figure), the locking members 154 are located at the locking position, and the locking members 154 lock the rotation of the output shaft 14 relative to the housing 11. When the motor shaft (not shown in the figure) transmits torque to the output shaft 14, the locking members 154 are located at the unlocking position, and the locking members 154 release the rotation of the output shaft 14. The shaft lock bracket 16 further includes or is formed with switching blocks 164 inserted between the shaft lock ring 151 and the locking members 154, and the switching blocks 164 switch the locking members 154 between the locking position and the unlocking position. By providing the first gap 1622, the shaft lock bracket 16 rotates relative to the output shaft 14 within a preset angle range so that the shaft lock bracket 16 drives the locking members 154 to switch between the locking position and the unlocking position.

Figure 8:
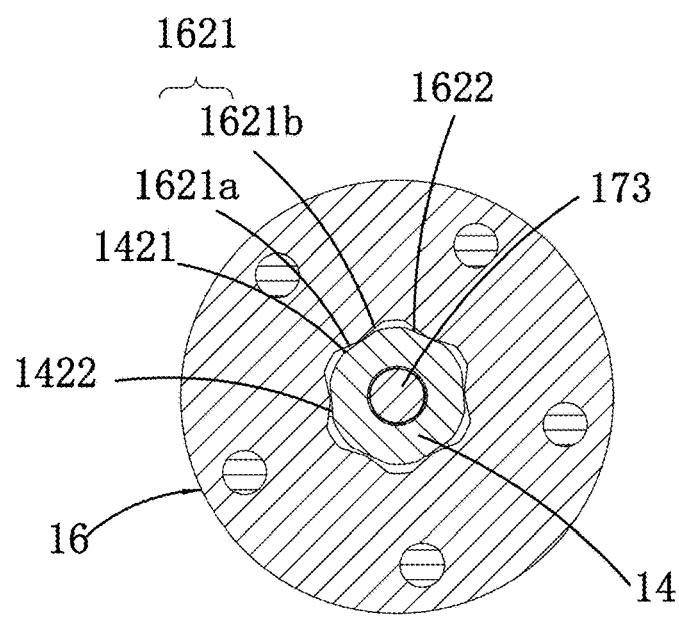
FIG. 8 is a sectional view of FIG. 4 taken along B-B, where locking members are located at an unlocking position.
Figure 9:
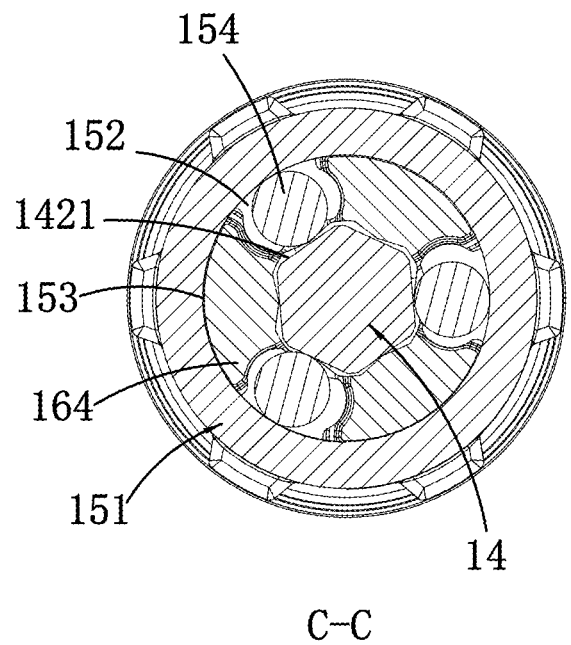
FIG. 9 is a sectional view of FIG. 4 taken along C-C, where locking members are located at an unlocking position.

As shown in FIGS. 8 and 9, during the operation of the power tool, when the electric motor 12 drives the output shaft 14 to rotate for forward transmission, the output shaft 14 and the shaft lock bracket 16 rotate synchronously or basically synchronously. When the locking members 154 are located at the unlocking position, the locking members 154 release the rotation of the output shaft 14.

When the speed of the electric motor 12 changes suddenly due to shutdown, gear shifting, or braking, the rotational speed of the output shaft 14 may be greater than the rotational speed of the shaft lock bracket 16 due to inertia, and the output shaft 14 may transmit torque to the motor shaft (not shown in the figure). In this case, due to inertia, the output shaft 14 and the shaft lock bracket 16 move relative to each other. When the speed of the output shaft 14 is too high, if the rotational speed of the output shaft 14 is not buffered in time, the output shaft 14 collides with the locking mechanism 15 due to inertia.

The buffer part 173 of the damping assembly 17 provided in this example extends axially. When the output shaft 14 and the shaft lock bracket 16 move relative to each other, the output shaft 14 drives the buffer part 173 to undergo the torsional deformation, and at the same time, the buffer part 173 applies a rebound force to the output shaft 14 to restore the output shaft 14 to the original state. The rebound force buffers the movement of the output shaft 14 relative to the shaft lock bracket 16, that is, the rebound force is used as a buffer force and delays the movement of the output shaft 14 relative to the shaft lock bracket 16. In this manner, the impact force of the output shaft 14 impacting on the locking mechanism 15 can be reduced to a certain extent, thereby improving the impact condition caused by inertia during braking, especially effectively improving the noise condition caused by the impact. At the same time, compared with the related art in which the damping structure is disposed in the first gap 1622 or the damping mechanism generates a buffer force by undergoing reciprocating deformation along a straight line perpendicular to the second axis 102, in this example, the damping assembly 17 is disposed outside the first gap 1622 so that the function of the first gap 1622 is not affected and the design and assembly difficulty is not increased. At the same time, basically no component force exists between the movement direction of the output shaft 14 and the direction in which the buffer force is provided, that is to say, both the output shaft 14 and the buffer part 173 rotate about the second axis 102. Therefore, the buffering efficiency is higher. During the forward transmission process, because the output shaft 14 and the shaft lock bracket 16 move basically synchronously, the locking mechanism 15 does not increase the damping force and thus does not affect the efficiency of the whole machine.

In this example, the output shaft 14 is formed with or connected to a transmission portion 141, and the transmission portion 141 is specifically an external hexagonal portion. The first outer circumferential surface 142 is an outer surface of the external hexagonal portion.

The shaft lock ring 151 is fixedly disposed in the housing 11, that is to say, the shaft lock ring 151 is not rotatable relative to the housing 11. The shaft lock ring 151 surrounds and is sleeved on the output shaft 14, a first accommodation space 152 is formed between the shaft lock ring 151 and the output shaft 14, and the locking members 154 are located in the first accommodation space 152 formed between the shaft lock ring 151 and the output shaft 14.

Figure 4:
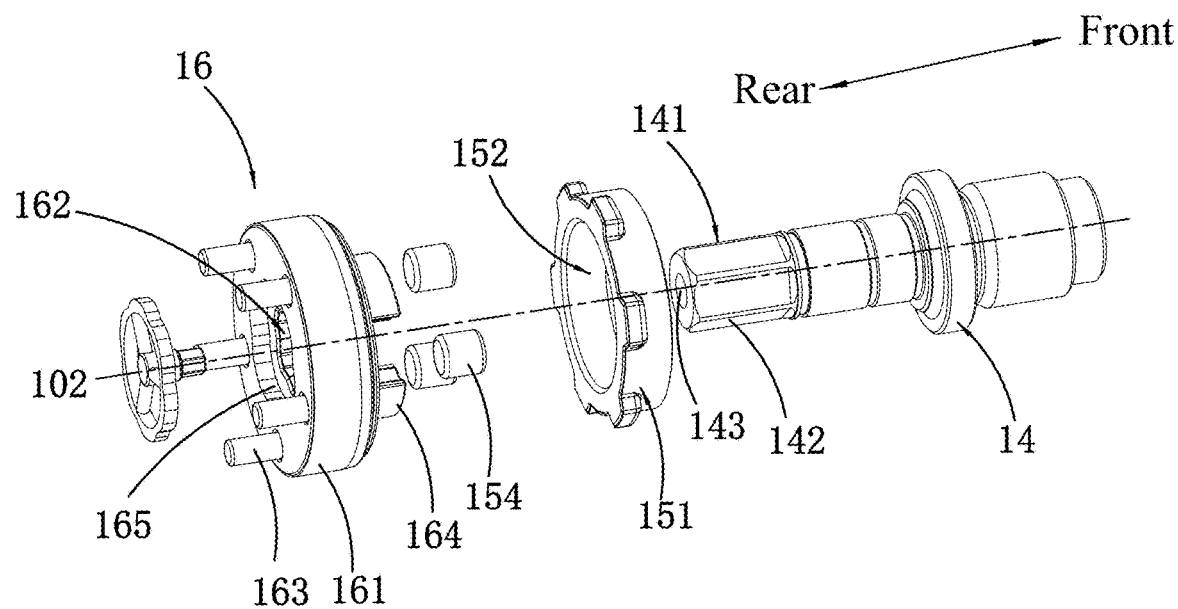
FIG. 4 is an exploded view of a locking mechanism in FIG. 1.
Figure 5:
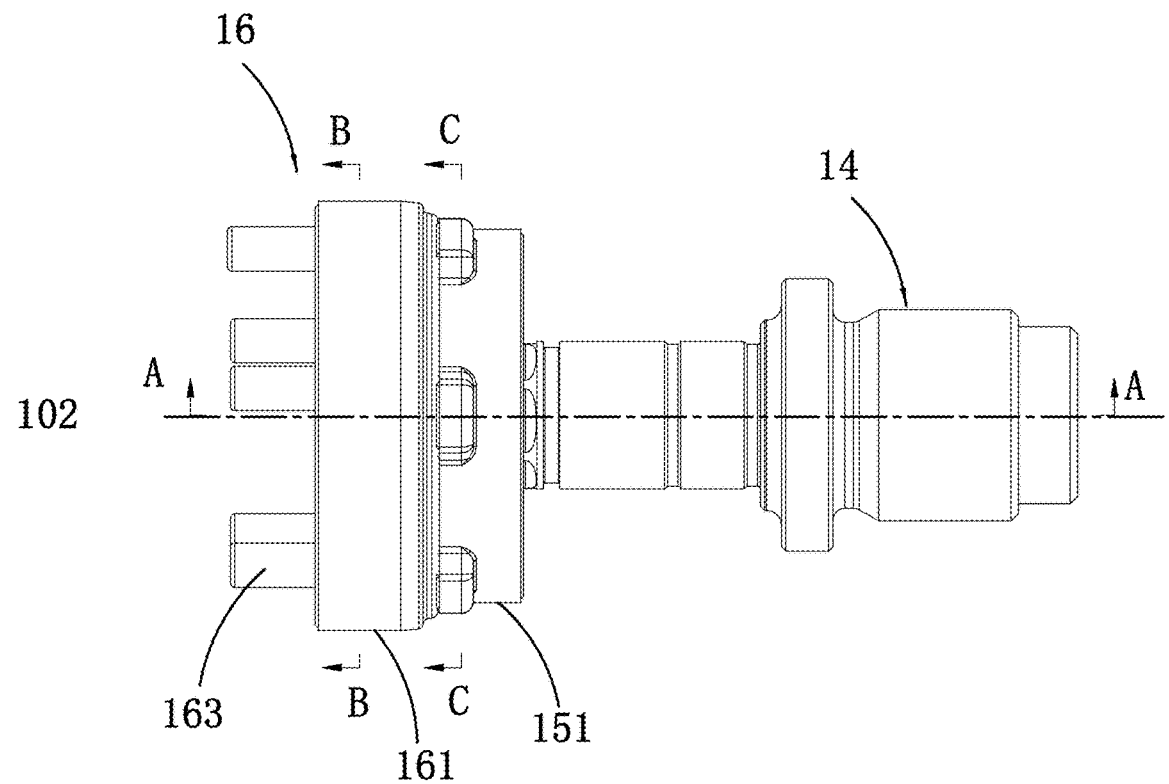
FIG. 5 is a structural view of the locking mechanism in FIG. 4 from another perspective.
Figure 6:
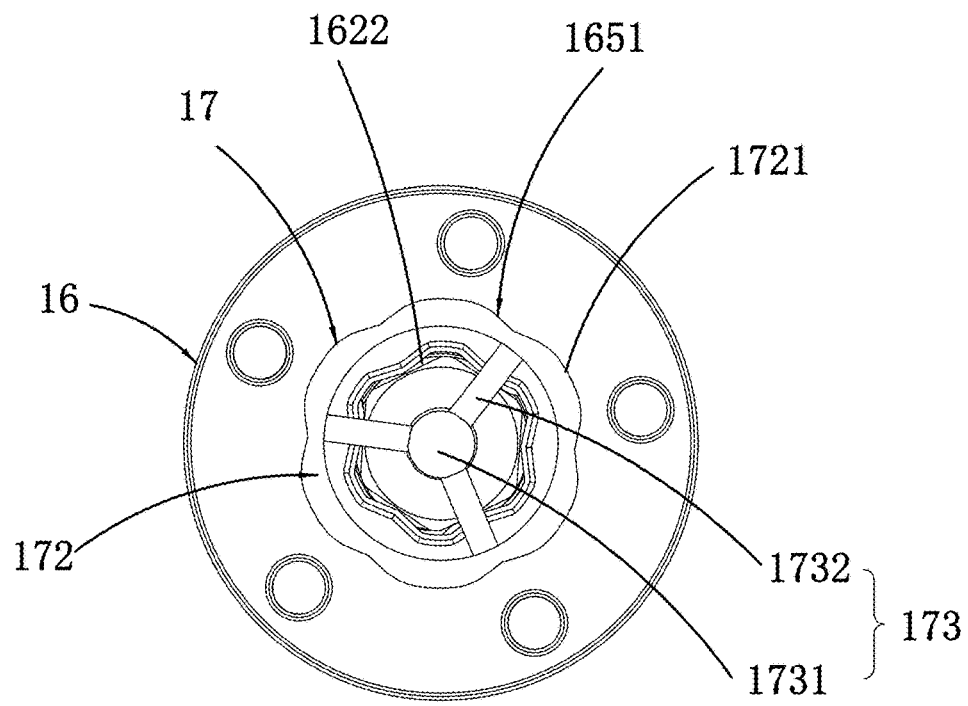
FIG. 6 is a left side view of the locking mechanism in FIG. 5.
Figure 7:
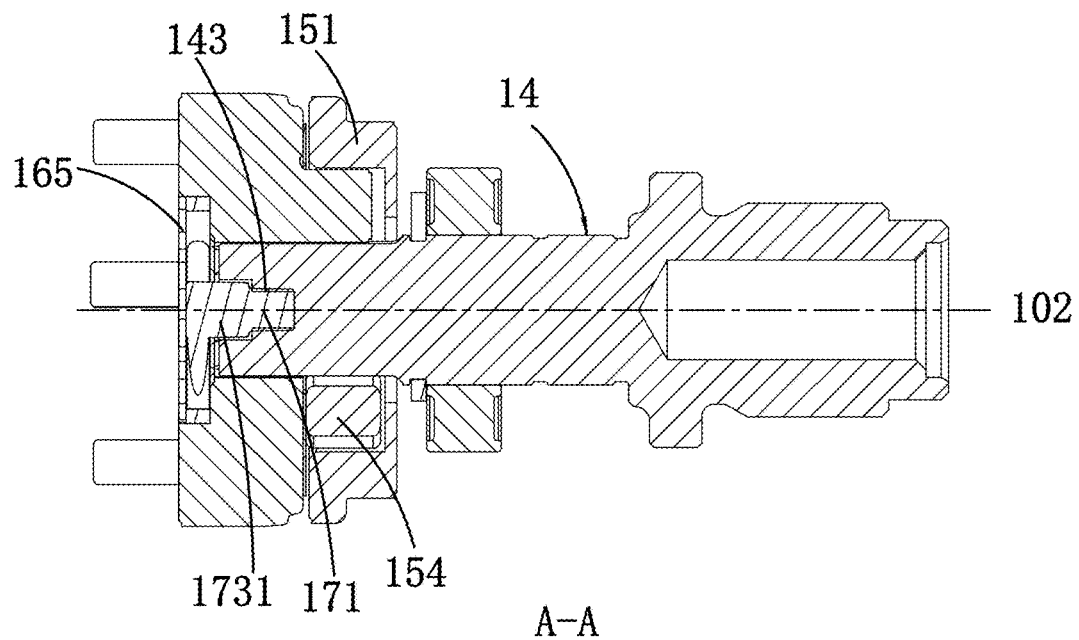
FIG. 7 is a sectional view of FIG. 4 taken along A-A.

As shown in FIGS. 4 and 5, the shaft lock bracket 16 includes a body portion 161, planet carriers 163 connected to the planetary gearsets 191, and the preceding switching blocks 164. The switching blocks 164 and the planet carriers 163 are disposed on two sides of the body portion 161, respectively. The body portion 161 substantially has a disc-shaped structure.

The body portion 161 is further formed with a drive hole 162. The transmission portion 141 of the output shaft 14 extends into the drive hole 162. In this example, the transmission portion 141 of the output shaft 14 is an external hexagonal structure, and the corresponding drive hole 162 is an octadecagonal hole that allows the transmission portion 141 to be in the drive hole 162 and to rotate relative to the shaft lock bracket 16 within a preset angle range. Of course, the specific structure of the drive hole 162 is not limited to this. As long as the structure of the drive hole 162 allows the transmission portion 141 to rotate within the drive hole 162 relative to the shaft lock bracket 16 within the preset angle range, the structure of the drive hole 162 falls within the scope of the present invention. Optionally, the transmission portion 141 of the output shaft 14 is not limited to the external hexagonal structure, and the transmission portion 141 of the output shaft 14 may have another transmission structure. Correspondingly, the structure of the drive hole 162 needs to allow the transmission portion 141 to rotate within the drive hole 162 relative to the shaft lock bracket 16 within the preset angle range.

In some examples, the shaft lock ring 151 is formed with a cylindrical surface 153 with the second axis 102 as the centerline, and the cylindrical surface 153 forms the preceding first accommodation space 152 around the output shaft 14.

The outer circumference of the output shaft 14, that is, the first outer circumferential surface 142, includes first planes 1421 and second planes 1422. The first planes 1421 are parallel to the first axis 101, and the second planes 1422 are also parallel to the first axis 101.

Optionally, the locking members 154 are cylindrical pins, and the cylindrical pin is disposed between the first plane 1421 and the cylindrical surface 153. In this example, to improve stability, three first planes 1421 are provided. Correspondingly, three cylindrical pins are provided. Three switching blocks 164 are provided. The three switching blocks 164 are each located between two adjacent cylindrical pins to push the cylindrical pins to move in the circumferential direction around the second axis 102. When the locking members 154 are located at the unlocking position shown in FIG. 9, the locking members 154 are rotatable between the cylindrical surface 153 and the first planes 1421, and the shaft lock bracket 16 can drive the output shaft 14 to rotate relative to the housing 11. When the locking members 154 are located at the locking position in FIGS. 11 and 13 due to reverse transmission of the output shaft 14, the locking member 154 abuts against the cylindrical surface 153 and the first plane 1421 at the same time. In this case, the positions of the locking members 154 in the circumferential direction around the first axis 101 are limited. In this case, the rotation of the output shaft 14 relative to the housing 11 is locked, that is to say, the rotation of the output shaft 14 relative to the shaft lock ring 151 is locked. Therefore, the user cannot rotate the output shaft 14 relative to the housing 11 from the side where the output mechanism 13 is located.

Figure 10:
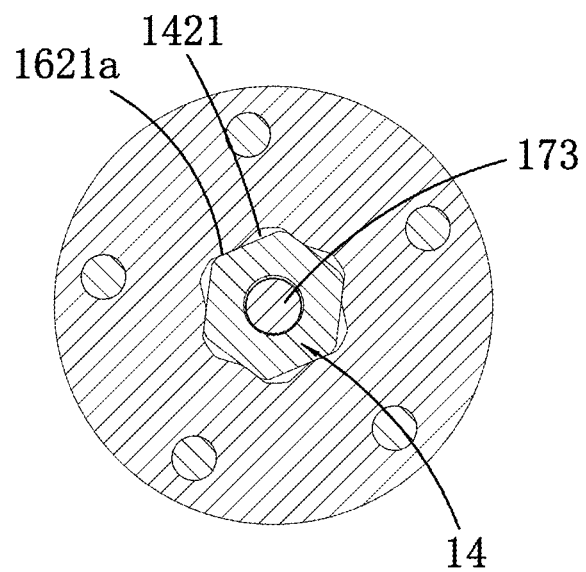
FIG. 10 is a sectional view of FIG. 4 taken along B-B, where an electric motor rotates clockwise, and locking members are located at a locking position.
Figure 11:
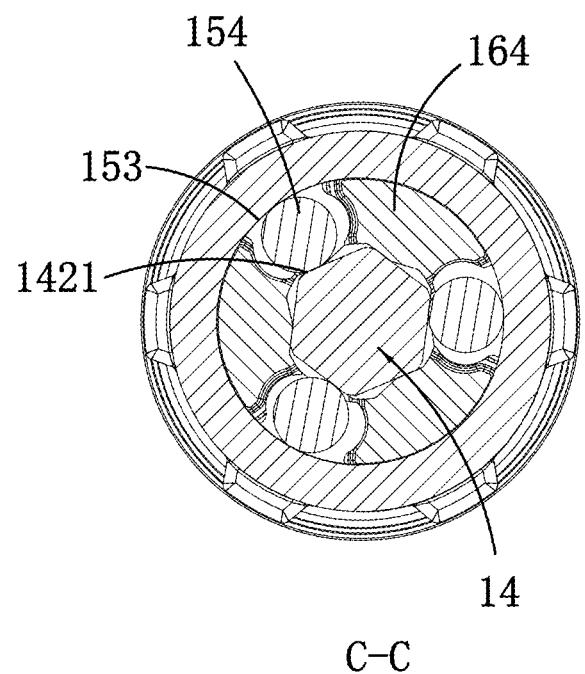
FIG. 11 is a sectional view of FIG. 4 taken along C-C, where an electric motor rotates clockwise, and locking members are located at a locking position.
Figure 12:
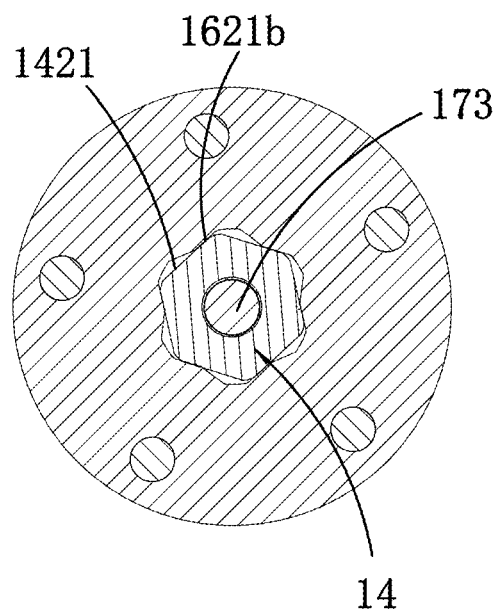
FIG. 12 is a sectional view of FIG. 4 taken along B-B, where an electric motor rotates counterclockwise, and locking members are located at a locking position.
Figure 13:
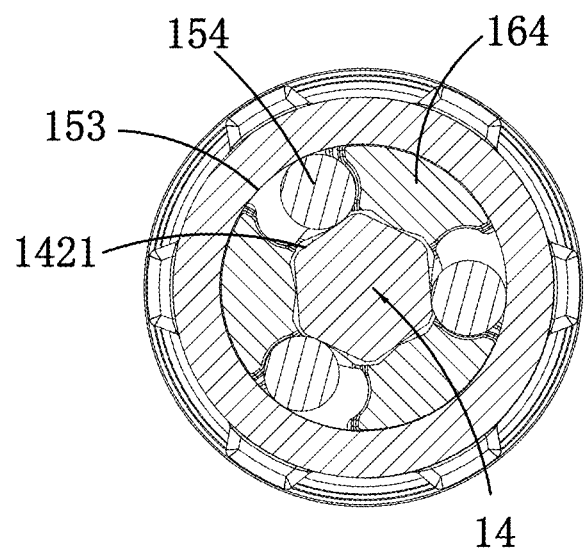
FIG. 13 is a sectional view of FIG. 4 taken along C-C, where an electric motor rotates counterclockwise, and locking members are located at a locking position.

As shown in FIGS. 8 to 13, in this example, the inner sidewall of the drive hole 162 (the octadecagonal hole) is the first inner surface 1621 to ensure that the locking members 154 can switch between the locking position and the unlocking position regardless of whether the output shaft 14 rotates clockwise or counterclockwise. The first inner surface 1621 has first drive surfaces 1621a and second drive surfaces 1621b. As shown in FIGS. 10 and 11, the motor shaft (not shown in the figures) rotates clockwise, and then the shaft lock bracket 16 drives the output shaft 14 to rotate clockwise. During braking or shifting gears suddenly, the output shaft 14 continues rotating clockwise due to inertia, and the first plane 1421 of the output shaft 14 may be in contact with the first drive surface 1621a. As shown in FIGS. 12 and 13, the motor shaft (not shown in the figures) rotates counterclockwise, and then the shaft lock bracket 16 drives the output shaft 14 to rotate counterclockwise. During braking or shifting gears suddenly, the output shaft 14 continues rotating counterclockwise due to inertia, and the first plane 1421 of the output shaft 14 may be in contact with the second drive surface 1621b.

Figure 14:
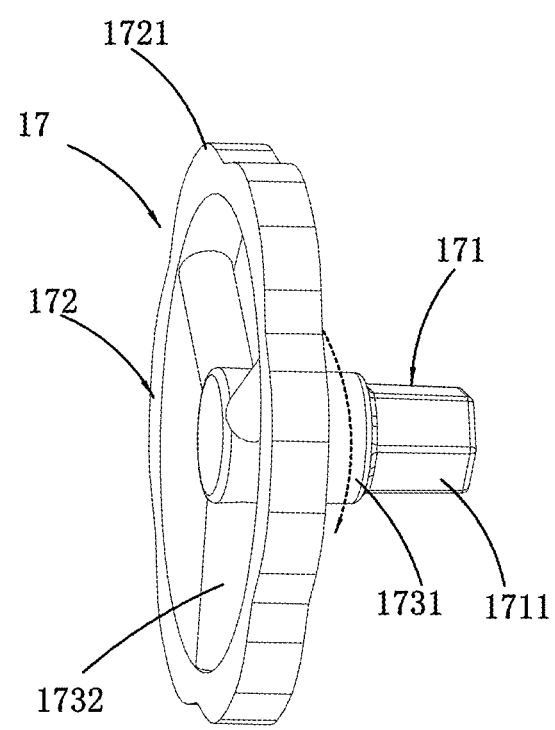
FIG. 14 is a structural view of a damping assembly in FIG. 4.

As shown in FIG. 14, the first mounting portion 171, the second mounting portion 172, and the buffer part 173 of the damping assembly 17 are an integrally formed component. In other alternative examples, the first mounting portion 171, the second mounting portion 172, and the buffer part 173 may be connected to form an integral component. The buffer part 173 is formed with or connected to an elastic structure. In this example, the damping assembly 17 is an elastic material component.

The first mounting portion 171 is inserted into a first mounting groove 143 that is provided on the rear end surface of the output shaft 14 and extends along the direction of the second axis 102. As shown in FIG. 14, the first mounting portion 171 is disposed in front of the second mounting portion 172. The first mounting portion 171 includes a first limiting portion 1711. The first mounting groove 143 is provided with a first receiving groove that mates with the first limiting portion 1711. The first receiving groove is a rectangular or polygonal groove. The first limiting portion 1711 mates with the first receiving groove so that the first mounting portion 171 and the output shaft 14 are rotatable synchronously, that is, the first limiting portion 1711 and the first receiving groove limit the circumferential rotational movement between each other. The second mounting portion 172 is inserted and mounted into a second mounting groove 165 formed on the rear end surface of the shaft lock bracket 16. In some examples, the first limiting portion 1711 extends along the radial direction of the first axis 101. In this example, the first mounting portion 171 is a rectangular block or a polygonal block.

The first mounting portion 171 and the second mounting portion 172 are arranged front and back along the direction of the second axis 102. The second mounting portion 172 includes a second limiting portion 1721. The second mounting groove 165 is provided with a second receiving groove 1651 that mates with the second limiting portion 1721. The second limiting portion 1721 mates with the second receiving groove 1651 so that the second mounting portion 172 and the shaft lock bracket 16 are rotatable synchronously, that is, the second limiting portion 1721 and the second receiving groove 1651 limit the circumferential rotational movement between each other. In this example, the second limiting portion 1721 extends along the radial direction of the second axis 102.

The buffer part 173 includes a first buffer part 1731 extending along the second axis 102 and connected to the first mounting portion 171. In this example, the first buffer part 1731 is cylindrical. The buffer part 173 further includes a second buffer part 1732 extending along a direction perpendicular to the second axis 102 and connected to the second mounting portion 172. In this example, the second buffer part 1732 is disposed along the circumferential direction of the first buffer part 1731 with the second axis 102 as the center. The second buffer part 1732 includes multiple cylinders with a diameter less than the diameter of the first buffer part 1731. The first buffer part 1731 is fixedly connected to the second buffer part 1732.

The circumferential dimension of the first buffer part 1731 is greater than the circumferential dimension of the first mounting portion 171, thereby limiting the position of the first buffer part 1731 along the second axis during installation. In this manner, the first buffer part 1731 is prevented from entering the first mounting groove 143.

Figure 15:
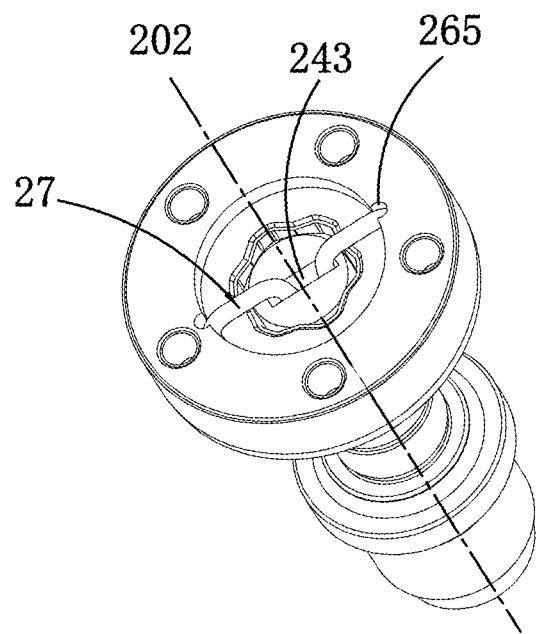
FIG. 15 is a structural view of a locking mechanism according to a second example of the present application.
Figure 16:
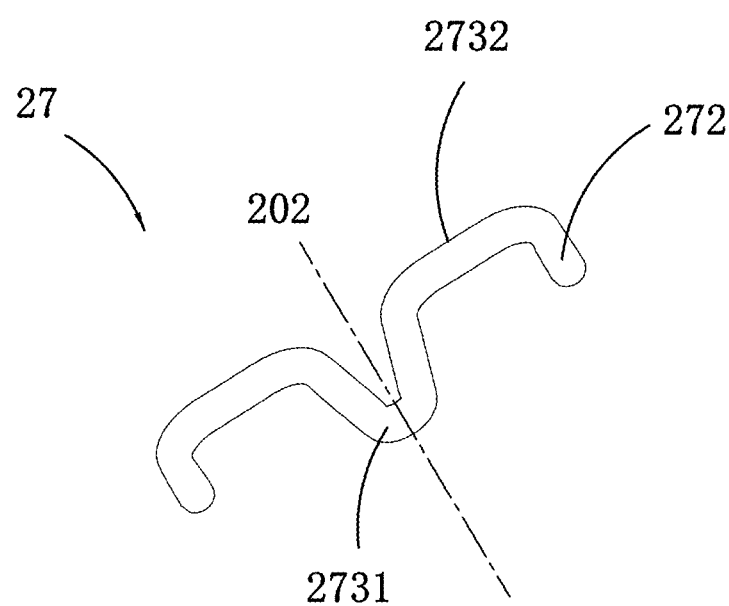
FIG. 16 is a structural view of a damping assembly in FIG. 15.

As shown in FIGS. 15 and 16, a power tool according to the second example of the present application is shown, and the second example differs from the first example in the specific structure of a damping assembly 27.

The first mounting portion and the first buffer part are combined into a first buffer part 2731. The first buffer part 2731 is a substantially V-shaped or U-shaped structure extending along a second axis 202. A first mounting groove 243 extends along the second axis 202, and the opening width of the groove is less than the opening width of the corresponding position of the first buffer part. In this manner, the first buffer part 2731 is in the first mounting groove 243 and abuts against the first mounting groove 243.

A second buffer part 2732 is connected to the first buffer part 2731. A second mounting portion 272 is connected to the second buffer part 2732. The second mounting portions 272 are symmetrically arranged; since the first buffer part 2731 is a substantially V-shaped or U-shaped structure extending along the second axis 202, the second mounting portion 272 is elastically deformable in a direction perpendicular to the second axis. In this manner, the second mounting portion 272 is in a second mounting groove 265 and abuts against the second mounting groove 265.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A power tool, comprising:
   a housing;
   a motor accommodated in the housing and comprising a drive shaft rotating about a first axis;
   an output shaft for outputting torque and rotating about a second axis; and
   a locking mechanism for locking the output shaft when the output shaft is subjected to a force and transmits torque to the drive shaft, wherein the locking mechanism comprises:
     a shaft lock bracket connected to the output shaft to drive the output shaft; and
     a damping assembly comprising a first mounting portion connected to the output shaft, a second mounting portion connected to the shaft lock bracket, and a buffer part connecting the first mounting portion to the second mounting portion,
   wherein, when the output shaft and the shaft lock bracket move relative to each other, the buffer part undergoes torsional deformation to provide a buffer force that delays movement of the output shaft relative to the shaft lock bracket, and
   wherein a rear end surface of the output shaft is provided with a first mounting groove, and the first mounting portion is inserted into the first mounting groove.

2. The power tool of claim 1, wherein the output shaft has a first outer circumferential surface, the shaft lock bracket comprises a first inner surface circumferentially surrounding the first outer circumferential surface, a first gap is provided between the first inner surface and the first outer circumferential surface, and the damping assembly is disposed outside the first gap.

3. The power tool of claim 1, wherein the buffer part at least partially extends along a direction of the second axis.

4. The power tool of claim 1, wherein the first mounting portion, the second mounting portion, and the buffer part are an integral component.

5. The power tool of claim 1, wherein the locking mechanism further comprises a shaft lock ring disposed around the output shaft and locking members disposed between the shaft lock ring and the output shaft, and the locking members are placeable into at least a locking position and an unlocking position relative to the shaft lock ring.

6. The power tool of claim 5, wherein the shaft lock ring is disposed in the housing, and the shaft lock ring and the housing are not rotatable relative to each other.

7. The power tool of claim 5, wherein, when the output shaft transmits torque to the drive shaft, the locking members are located at the locking position, and the locking members lock rotation of the output shaft relative to the housing; and, when the drive shaft transmits torque to the output shaft, the locking members are located at the unlocking position, and the locking members release the rotation of the output shaft relative to the housing.

8. The power tool of claim 5, wherein the shaft lock bracket is further connected to or formed with switching blocks inserted between the shaft lock ring and the locking members, and the switching blocks are used for switching the locking members between the locking position and the unlocking position.

9. The power tool of claim 2, wherein the shaft lock bracket rotates relative to the output shaft within a preset angle range.

10. The power tool of claim 1, wherein the first mounting portion rotates synchronously with the output shaft.

11. The power tool of claim 1, wherein the second mounting portion rotates synchronously with the shaft lock bracket.

12. The power tool of claim 1, wherein the buffer part comprises a first buffer part extending along the second axis and connected to the first mounting portion and a second buffer part extending along a direction perpendicular to the second axis and connected to the second mounting portion.

13. The power tool of claim 12, wherein the first buffer part and the second buffer part are fixedly connected or integrally formed.

14. The power tool of claim 1, wherein the first mounting portion and the second mounting portion are arranged front and back along a direction of the second axis.

15. The power tool of claim 1, further comprising a battery pack, wherein the battery pack supplies power to the motor.

16. A power tool, comprising:
   a housing;
   a motor accommodated in the housing and comprising a drive shaft rotating about a first axis;
   an output shaft for outputting torque and rotating about a second axis, wherein the output shaft has a first outer circumferential surface; and a locking mechanism for locking the output shaft when the output shaft is subjected to a force and transmits torque to the drive shaft, wherein the locking mechanism connects the motor to the output shaft;

wherein the locking mechanism comprises:

a shaft lock bracket comprising a first inner surface at least surrounding part of the first outer circumferential surface, wherein a first gap is provided between the first inner surface and the first outer circumferential surface; and a damping assembly comprising a buffer part, wherein when the output shaft and the shaft lock bracket move relative to each other, the buffer part undergoes torsional deformation to provide a buffer force that delays movement of the output shaft relative to the shaft lock bracket, and wherein the shaft lock bracket is provided with a drive hole and a mounting groove arranged in sequence from front to rear along the second axis, the drive hole is configured to drive the output shaft to rotate and provide with the first inner surface, an aperture of the mounting groove is larger than that of the drive hole, the damping assembly comprises a first mounting portion connected to the output shaft and a second mounting portion arranged in the mounting groove, and the buffer part connects the first mounting portion to the second mounting portion.

17. The power tool of claim 16, wherein the locking mechanism further comprises a shaft lock ring disposed around the output shaft and locking members disposed between the shaft lock ring and the output shaft, and the locking members are placeable into at least a locking position and an unlocking position relative to the shaft lock ring.

18. The power tool of claim 16, wherein the shaft lock bracket rotates relative to the output shaft within a preset angle range.

19. A power tool, comprising:

a housing;

a motor accommodated in the housing and comprising a drive shaft rotating about a first axis;

an output shaft for outputting torque and rotating about a second axis; and a locking mechanism for locking the output shaft when the output shaft is subjected to a force and transmits torque to the drive shaft, wherein the locking mechanism comprises:

a shaft lock bracket connected to the output shaft to drive the output shaft; and a damping assembly comprising a first mounting portion connected to the output shaft, a second mounting portion connected to the shaft lock bracket, and a buffer part connecting the first mounting portion to the second mounting portion, wherein, when the output shaft and the shaft lock bracket move relative to each other, the buffer part undergoes torsional deformation to provide a buffer force that delays movement of the output shaft relative to the shaft lock bracket;

wherein the second mounting portion is a ring-shaped member, and the ring-shaped member is disposed in the shaft lock bracket.

* * * * *